(12) United States Patent
Duran et al.

(10) Patent No.: US 8,713,969 B2
(45) Date of Patent: May 6, 2014

(54) TUNING TZC BY THE ANNEALING OF ULTRA LOW EXPANSION GLASS

(75) Inventors: Carlos Duran, Ottawa (CA); Kenneth Edward Hrdina, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 187 days.

(21) Appl. No.: 12/868,934

(22) Filed: Aug. 26, 2010

(65) Prior Publication Data

US 2011/0048075 A1 Mar. 3, 2011

Related U.S. Application Data

(60) Provisional application No. 61/238,394, filed on Aug. 31, 2009.

(51) Int. Cl.
*C03B 25/00* (2006.01)
(52) U.S. Cl.
USPC .............................................. 65/117; 501/54
(58) Field of Classification Search
None
See application file for complete search history.

(56) References Cited

U.S. PATENT DOCUMENTS

| | | | |
|---|---|---|---|
| 5,696,038 A | 12/1997 | Maxon | |
| 5,970,751 A | 10/1999 | Maxon et al. | |
| 6,931,097 B1 * | 8/2005 | Davis et al. | 378/84 |
| 6,988,277 B2 | 1/2006 | Kovac et al. | |
| 7,155,936 B2 | 1/2007 | Dawes et al. | |
| 7,410,922 B2 | 8/2008 | Iwahashi et al. | |
| RE40,586 E | 11/2008 | Hrdina et al. | |
| 2004/0027555 A1 | 2/2004 | Hrdina et al. | |
| 2005/0245382 A1 * | 11/2005 | Iwahashi et al. | 501/54 |
| 2005/0245383 A1 * | 11/2005 | Iwahashi et al. | 501/54 |
| 2007/0137252 A1 | 6/2007 | Maxon et al. | |
| 2007/0137253 A1 * | 6/2007 | Beall et al. | 65/384 |
| 2009/0004088 A1 * | 1/2009 | Kuehn et al. | 423/335 |
| 2009/0143213 A1 | 6/2009 | Hrdina et al. | |
| 2010/0317505 A1 * | 12/2010 | Koike et al. | 501/54 |

* cited by examiner

*Primary Examiner* — Matthew Daniels
*Assistant Examiner* — Lisa Herring
(74) *Attorney, Agent, or Firm* — Walter M. Douglas (57) ABSTRACT

The disclosure describes a method by which the Tzc of a silica-titania glass article, for example, a EUVL mirror substrate, can be tuned to within a specification range by means of a selected final anneal that shifts Tzc of the article or substrate to the desired Tzc value. In addition, since different mirrors in a set can be specified at different values of Tzc, this process can be on used glass samples or pieces from a single glass boule to make parts with different Tzc values, thus reducing the number of separate boules required to fill an order.

10 Claims, 5 Drawing Sheets

TUNING TZC BY THE ANNEALING OF ULTRA LOW EXPANSION GLASS

PRIORITY

This application claims the priority of U.S. Provisional Application No. 61/238,394 titled "Tuning Tzc By the Annealing of Ultra Low Expansion Glass" which was filed on Aug. 31, 2009 in the name of Carlos Duran and Kenneth E. Hrdina.

FIELD

This disclosure invention is directed to a method for shifting the CTE zero crossover temperature (Tzc) of a silica-titania using an annealing step specifically tailored to produce a desired Tzc shift and to silica-titania glass with adjusted Tzc produced by the method.

BACKGROUND

Ultra low expansion silica-titania glass such as ULE® glass (Corning Incorporated) is the material of choice for mirror substrates for use in Extreme Ultraviolet Lithography (EUVL) tools due to its extremely low coefficient of thermal expansion (CTE). The ULE substrates are specified within a very narrow range for the value of the average zero CTE crossover temperature, Tzc. While Tzc can be controlled by glass composition, which is defined at the time of glass forming, it can also be affected by the thermal history of the glass. Control of the composition during the glass forming stage is not always sufficiently accurate such that a particular sample or boule of glass will satisfy the glass requirements for a certain part if the specification for Tzc is too narrow. For example, in combustion processes where silica-containing and titanium-containing feedstocks are fed (mixed or not mixed) into burners, combusted into silica and titania oxides, deposited in a vessel and formed into a glass, the plugging of the burners (partial or complete in one or more burners) or variations pump rates (perhaps due to a voltage variation or pump problem) can cause some variations in the formed glass composition.

In the near future it is envisioned that the Tzc requirements will be tightened and that the size of the glass substrates required for EUVL substrates will increase. The difficulty in meeting these future requirements will not only be affected by any problems that may be encountered in the glass manufacturing process, but will be further compounded by the increase in size of the parts. As a result, it is also highly desirable to have a method by which the Tzc of a silica-titania glass EUVL mirror (or other) substrate can be tuned to within the desired specification range. In addition, since is desirable that the different mirrors in a set of mirrors can be specified at different values of Tzc, it is further desirable that the method be suitable to make the different Tzc required for each mirror formed from a single boule of glass, or different mirrors made from a single large glass sample, thus reducing the number of separate boules or large samples required to fill an order. That is, multiple mirror parts can be shaped from a single boule or large sample of glass and then the Tzc of each individual part adjusted as needed.

SUMMARY

In one aspect this disclosure describes a method by which the Tzc of a silica-titania glass article, for example, a EUVL mirror substrate, can be tuned to within the specification range by means of a final anneal that shifts Tzc of the substrate to the desired value. In addition, since different mirrors in a set can be specified at different values of Tzc, this process can be used to make parts with different Tzc from the same boule of glass, thus reducing the number of separate boules or large samples required to fill an order. The method can also be used to shift the Tzc of any glass sample or article that has been formed and/or shaped.

In one embodiment the disclosure is directed to a method for adjusting the Tzc of a silica-titania glass, said method comprising the steps of:

preparing a consolidated silica-titania glass boule having a titania content in the range of 5-20 wt %, annealing the consolidated glass boule using a first selected annealing cycle determining the initial crossover temperature $Tzc0$ and the initial fictive temperature $Tf0$ of the silica-titania glass, adjusting the value of Tzc using a selected second annealing cycle whose conditions are determined using the function $$Tf(\text{TARGET}) = f(Tf0, Tzc0, Tzc(\text{TARGET}))$$

where $Tzc0$ is the initial zero crossover temperature of the annealed glass and $Tf0$ is the initial fictive temperature of the annealed glass, and $Tzc(\text{TARGET})$ is the targeted Tzc value. The second selected annealing cycle comprises:

heating the silica-titania glass from ambient temperature to a selected high temperature in the range of 900° C. to 1050° C.;

holding the glass at the selected high temperature for a time longer than the relaxation time constant for the glass Tf at the selected temperature;

cooling the glass from the selected high temperature to a selected intermediate temperature in the range of 750° C. to 850° C. at a selected cooling rate of X ° C./hour, wherein the cooling rate X is in the range of 0.05° C./hour to 50° C./hour; and cooling the glass from the intermediate temperature to ambient temperature at a cooling rate in the range of 5-100° C./hour. In one embodiment the hold time at the selected high temperature is in the range of 0.5 hour to 12 hours. In addition, the cooling from the selected high temperature to the selected intermediate temperature is subdivided into a series of smaller steps with each step having its own specific cooling rate and temperature range, with the cooling rate for each successive step decreasing as the step-to-step temperature decreases. For example without limitation, if the selected high temperature was 1050° C. and the intermediate temperature was 850° C., a 3-step process might be to cool from 1050° C. to 975° C. at a rate of 5° C./hour, followed by cooling from 975° C. to 900° C. at a rate of 2° C./hour followed by cooling from 900° C. to 850° C. at a rate of 1° C./hour. In another embodiment the silica-titania glass has a titania content in the range of 5-20 wt. %. In an addition embodiment the silica-titania glass has a titania content in the range of 5-12 wt. %. In another embodiment the silica-titania glass has a titania content in the range of 6-9 wt. %. In another embodiment the silica-titania glass has a titania content in the range of 12-20 wt. %. In another embodiment the silica-titania glass have a titania content in the range of 12-16 wt. %. The disclosure is further directed to a silica-titania glass according to the method described above and to articles made from the glass. In one embodiment Tzc for any silica-titania glass composition having a titania content in any of the ranges of 5-20 wt. %, 5-12 wt. %, 6-9 wt.%, 12-20 wt. % and 12-16 wt. % is adjustable by ±10° C. or less without adjustment to the titania content. In another embodiment Tzc is adjustable for any of the foregoing titania content ranges by ±5° C. or less without adjustment to the titania content.

In another embodiment the disclosure describes a method for adjusting the Tzc of a silica-titania glass, said method comprising the steps of:
preparing a consolidated silica-titania glass boule;
annealing the consolidated glass boule at a selected annealing temperature cycle;
determining the initial crossover temperature Tzc0 of the silica-titania glass blank and determining the initial fictive temperature Tf0 of the glass
preparing a silica-titania glass blank from the glass boule,
adjusting the value of Tzc using a selected second annealing cycle whose conditions are determined using the function $$Tf(\text{Target})=f(Tf0, Tzc0, Tzc(\text{Target}))$$

where Tzc0 is the initial zero crossover temperature of the annealed glass and Tf0 is the initial fictive temperature of the annealed glass. The second selected annealing cycle comprises:
heating the glass from 25° C. to 1020° C. (for example without limitation, at a rate in the range of 3-50° C./minute, with the rate decreasing as the upper temperature is approached),
holding the glass at the 1020° C. temperature for a time in the range of 0.75 to 2.0 hours,
cooling the glass from, 1020° C. to 800° C. at a selected cooling rate X ° C./hour, and
cooling the glass from 800° C. to 25° C. at a rate in the range of 3-8° C./hour;
wherein the cooling rate X is in the range 0.2° C./hour to 50° C./hour.
In one embodiment the cooling rate from 800° C. to 25° C. is at a rate in the range of 4-6° C./hour. In another embodiment the hold time at 1020° C. is 1 hour±0.2 hour. In another embodiment the silica-titania glass has a titania content in the range of 5-20 wt. %. In an addition embodiment the silica-titania glass has a titania content in the range of 5-12 wt. %. In another embodiment the silica-titania glass has a titania content in the range of 6-9 wt. %. In another embodiment the silica-titania glass has a titania content in the range of 12-20 wt. %. In another embodiment the silica-titania glass have a titania content in the range of 12-16 wt %. The disclosure is further directed to a silica-titania glass according to the method described above and articles made from the glass. In one embodiment Tzc for any silica-titania glass composition having a titania content in any of the ranges of 5-20 wt %, 5-12 wt %, 6-9 wt %, 12-20 wt % and 12-16 wt % is adjustable by ±10° C. or less without adjustment to the titania content. In another embodiment Tzc is adjustable for any of the foregoing titania content ranges by ±5° C. or less without adjustment to the titania content.

The disclosure is also directed to a silica-titania glass having a selected titania content in the range of 6-9 wt % and an adjustable Tzc associated with a titania content within this range, said Tzc being adjustable by ±5° C. or less without any adjustment to the titania content. In one embodiment the silica-titania glass contains 7.5±0.3 wt % titania and has an adjustable Tzc centered at 20° C.±1° C., said Tzc being adjustable by ±10° C. or less. In another embodiment the silica-titania glass contains 7.5±0.3 wt % titania and has an adjustable Tzc centered at 20° C.±1° C., said Tzc being adjustable by ±5° C. or less. In a further embodiment the silica-titania glass contains 8.1±0.3 wt % titania and has an adjustable Tzc centered at 20° C.±1° C., said Tzc being adjustable by ±10° C. or less. In some embodiments the Tzc is adjusted by ±3° C. or less.

DETAILED DESCRIPTION

Herein, the terms "boule" and "glass boule" mean a glass object having a selected diameter (or length and width) and thickness. Boules can have any size. For example without limitation, their size (diameter×thickness) can range from 10 cm×5 cm to 2 m×0.5 m, or one can form a "boule" whose length and width are 15 cm and whose thickness is 7 cm. Alternatively, a glass preform can be made on a mandrel, the preform removed from the mandrel, and then consolidated and melted to form a shaped substrate that can be used to make an EUVL article, for example without limitation, a mirror. The boule can be formed directly by any method known in the art or it can be formed by consolidation of a glass preform made by any method known in the art. The silica and titania precursors used to make a silica-titania glass can be any silicon and titanium halide or organometallic compound known in the art as useful for making such glass, or mixtures thereof. The Tzc of articles, or substrates, made from any size boule can be tuned using the method described herein. The Tzc of articles or substrates made from other shapes of silica-titania glass can also be tuned using the method described herein. Also herein the terms "substrates" and "parts" may be used interchangeably. Herein ULE® glass by Corning Incorporated is used, without limitation, as an exemplary silica-titania glass and the glass may be referred to as ULE glass or silica-titania glass. The Tzc of any silica-titania glasses can be adjusted using the principles and techniques described herein. Also herein the terms "ambient temperature" and "room temperature" mean the general temperature or a location, typically inside a building, in which people work, for example, a temperature in the range of approximately 18° C. to approximately 30° C.

Methods of making silica-titania glass whose Tzc can be adjusted in accordance with the present disclosure include U.S. Pat. Nos. 5,696,038, 5,970,751, 6,988,277, 7,155,936, RE 40586, 7,410,922, and U.S. Patent application Nos. 2004/0027555, 2007/0137252 and 2009/0143213, and all of whose teaching are incorporated herein by reference. For example, U.S. Pat. No. 5,970,751 describes a method and apparatus for preparing fused silica-titania glass. The apparatus includes a stationary cup or vessel. U.S. Pat. No. 5,696,038 describes using oscillation/rotation patterns for improving off-axis homogeneity in fused silica boules using a prior art rotating cup as described therein. As disclosed in U.S. Pat. No. 5,696,038, the x-axis and y-axis oscillation patterns were defined by the equations:

$$x(t) = r_1 \sin 2\pi\omega_1 t + r_2 \sin 2\pi\omega_2 t$$

$$y(t) = r_1 \cos 2\pi\omega_1 t + r_2 \cos 2\pi\omega_2 t$$

where x(t) and y(t) represent the coordinates of the center of the boule as measured from the center of the furnace ringwall as a function of time (t) measured in minutes. The sum of $r_1$ and $r_2$ ($r_1$ and $r_2$ are the radii of the offsets; that is, the rotation acts like a rotating table on top of 2 other rotating tables offset by the "r's") must be less than the difference between the radius of the ringwall and radius of the containment vessel or cup to avoid contact between these structures during formation of the boule. The parameters $r_1$, $r_2$, $\omega_1$, $\omega_2$, and a fifth parameter, $\omega_3$, which represents the boule's rotation rate about its center in revolutions per minute (rpm) define the total motion of the boule. Typical values for $\omega_1$, $\omega_2$ and $\omega_3$ used in the manufacture of titania-containing silica boules were 1.71018 rpm, 3.63418 rpm and 4.162 rpm, respectively. In another example, U.S. Pat. No. 7,410,922 describes preparing a silica-titania glass by deposition of silica-titania particles on a target such as a quartz rod or plate, and heating the deposited particles to a vitrification temperature to obtain a silica-titania glass body. In a further example U.S. Patent Application Publication No. 2004/0027555 describes a method for producing low expansion, titania-containing silica glass bodies by depositing titania-containing glass soot and consolidating it to form a silica-titania glass body, and further describes the lessening of striae in the determination that the flows through the exhaust ports or vents of the furnace impact striae and that striae could be lessened by increasing the number of vents or exhaust ports.

The semiconductor industry produces the silicon chips that have fueled the information revolution that took place during the last few decades. The industry has succeeded in this enterprise by continuously improving the performance of semiconductor chips while simultaneously reducing their manufacturing cost. This has been achieved by means of ever increasing the optical resolution of lithography scanners, which has enabled production of chips with ever shrinking feature sizes. The push for resolution has resulted in the reduction of the operating wavelength of the scanners. The limit practically attainable using traditional, refractive optics has been reached at the current wavelength of ~193 nm, generated by ArF excimer lasers. ArF scanners are about to reach the smallest feature sizes that they are capable of, meaning that the industry needs to find a new technology if it is to continue to increase the density of components within integrated circuits. The most likely candidate to replace Optical Lithography when this technique reaches the limit of its technical capability is Extreme Ultraviolet Lithography (EUVL). Several pilot-line EUVL tools are currently in operation, and it is expected that chip production using this technology will start in a few years from now. Production-capable EUVL tools are in the design stage at this point in time. One key difference between current, pilot-line tools and production tools is the much higher light source intensity required by the latter in order to fulfill production throughput requirements. Future generations of tools are likely to intensify this trend, as they push for greater productivity and enhanced resolution.

EUVL is similar to current optical lithography in that it relies on an optical projection system to reproduce features from a master reticle (also known as mask) onto a thin photosensitive layer (resist) deposited on the surface of a semiconductor wafer. EUVL operates at a wavelength of ~13.4 nm, a wavelength at which no known material is transparent. Thus, the EUVL projection systems need to be built based on reflective components (mirrors) rather than refractive elements (lenses). The extremely short wavelength of the EUV radiation poses a number of challenges to the EUVL system designers; for example, reflective coatings on the mirrors are fundamentally limited to ~70% efficiency, implying that 30% of the radiation is lost at each surface. This radiation is absorbed as heat by the mirror substrate and causes mirror deformation if the material expands or contracts with temperature changes. Additionally, since gases absorb 13.4 nm radiation, the system must operate in vacuum, making it more difficult to remove heat from the mirrors and exacerbating the problem of mirror heating. Consequently, extremely tight requirements are placed on the materials used to make the mirror substrates to be used in a EUVL system. Silica-titania glass such as ULE glass is the material of choice for production of EUVL projection mirrors. ULE glass has an extremely low coefficient of thermal expansion (CTE) at room temperature, which is critical in allowing the shape of the mirror to stay substantially constant upon heating. The material also possesses other key properties, for example low striae, which enable the production of very precise mirror surfaces, long term chemical and dimensional stability, and compatibility with a vacuum environment.

The zero CTE crossover temperature (Tzc) of a part of silica-titania glass (also frequently referred to as "titania-doped silica glass") depends on its composition. Glass substrates for use in EUVL projection systems require that the average Tzc for the substrate be within a very narrow specification range. However, due to inherent limitations of silica-titania glass manufacturing processes, and the continuing evolution of the specification range for Tzc, it is difficult to reliably produce glass boules that will consistently yield substrates within the required Tzc range in high yields. In addition, since in a typical projection system there are different mirrors that are specified to have different values of Tzc, production of a set of mirrors might potentially demand the manufacturing of a different glass boule for each mirror. Although manufacturing different boules for different mirrors does not directly impact yield, it does increase costs through more complex manufacturing, inventory management and warehousing.

The present disclosure teaches the tuning of the Tzc of glass substrates to within narrowly defined ranges that are not be achievable by composition control alone. Furthermore, it allows production of substrates with different Tzc from glass of the same composition, thus improving boule utilization and lowering overall costs. In addition, the disclosure enables minimization of the risk of producing unusable boules is by allowing the forming operation to target production to more conservative values of CTE. For example, knowing that a boule's CTE, and thus Tzc, can be adjusted, a boule targeted to produce substrates at the extreme end of the needed CTE values (for different mirrors in a set) can be produced to a CTE closer to the center of the distribution, sharply reducing the probability of the CTE value lying outside of the usable range. Tzc can then be adjusted as described herein. Although the advantages disclosed herein are in terms of application to EUVL systems, the method is generally applicable for setting Tzc on any volume of titania-silica glass requiring precise definition of this parameter, regardless of the intended use of the glass.

Figure 1:
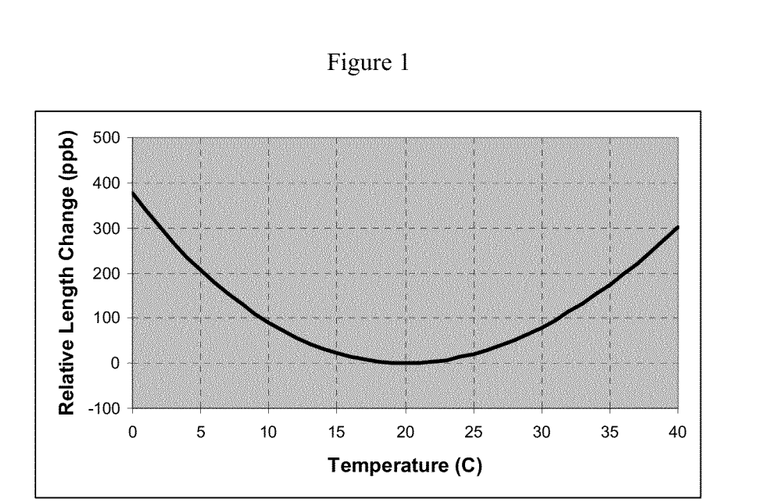
FIG. 1 is a graph illustrating the temperature dependence of the relative length of a piece of typical ULE glass of nominal composition that has been annealed using a standard annealing process.

All materials either expand or contract upon changes in temperature. ULE® glass is characterized by extremely small changes in dimensions at temperatures close to room temperature as seen in FIG. 1. FIG. 1 illustrates the temperature dependence of the relative length of a piece of typical ULE glass of nominal composition 7.5 wt % titania that has been annealed using a standard annealing process. At temperature below ~20° C. the glass shrinks at a rate that decreases with increasing temperature. At a temperature close to 20° C. the length of the glass piece reaches a minimum. At temperatures above 20° C. the length of piece increases with increasing temperature. The conditions of the standard ULE® annealing process are:

ramping the temperature from 25° C. to 990° C. at a rate of 50° C./hour;

holding the temperature at 990° C. for 10 hours;

after the 10 hour hold, lowering the temperature from 990° C. to 850° C. at a rate of 3° C./hour; and lowering the temperature from 850° C. to 25° C. at a rate of 25° C./hour.

Figure 2:
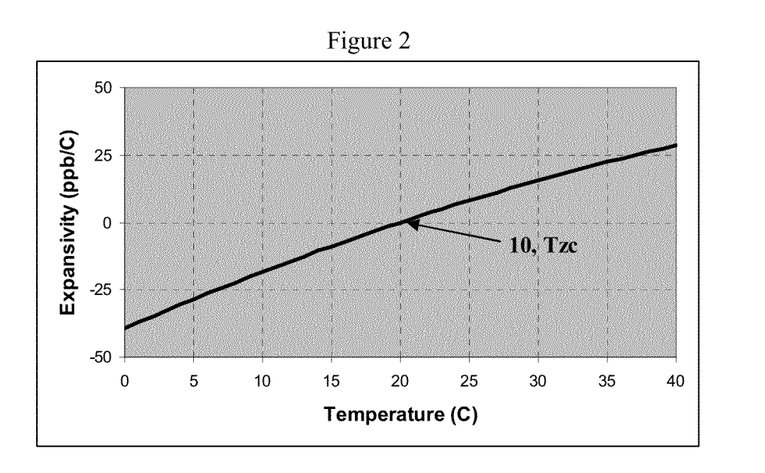
FIG. 2 is a graph illustrating the rate of change of the relative length (the "expansivity") of the same typical piece of ULE glass of FIG. 1 and the zero crossover temperature "Tzc".

The CTE of ULE glass is zero at a temperature called the "Zero Crossover Temperature", denoted "Tzc", as is illustrated in FIG. 2. FIG. 2 illustrates the "rate of change of the relative length (expansivity)" of the same glass part illustrated in FIG. 1. As FIG. 2 further shows, below Tzc the expansivity is negative at low temperatures (shrinkage) and is positive at higher temperatures (expansion). All ULE glass currently produced by Corning Inc. is subject to a standard fine annealing process as described above. One purpose of this process is to reduce internal stress in the glass since the detailed properties of the glass can depend on its thermal history. Another purpose of annealing is to make glass properties uniform over time. Consistent fine annealing is important for the purpose of characterization of ULE expansion properties. For example, production CTE measurements rely on ultrasonic measurements whose results are known to be affected by the thermal history of the glass.

Based on calculations of its thermal load, size, and heat removal rates afforded by the system, EUVL projection system designers calculate an optimum Tzc value for each mirror in the system. Silica-titania glass is being evaluated for use in experimental and in development EUVL systems. The development systems provide much of the functionality of production systems, except the high throughput that is needed for volume production. A key system component that is still under development by EUVL projection system designers is a bright light source for high volume production. Once a powerful light source is developed, the thermal load on the system mirrors will increase considerably. This high thermal load will require that the expansivity of the individual mirrors in a system be more carefully controlled then ever before since different mirrors can be subjected to different thermal loads. Accordingly, the Tzc of the individual mirrors will have to be "tuned" so that each mirror will be able to bear the thermal load to which it will be subjected during operation. In addition, in order for high volume production systems to be useful for producing several generations of semiconductor chips, they need to be designed with a large enough numerical aperture (NA), which requires mirrors of larger sizes. (However, larger mirror size increases the thermal load on a mirror and can also lead to thermal gradients across the dimensions of the mirror,) These factors are already incorporated in systems that are now in the design phase.

Figure 3:
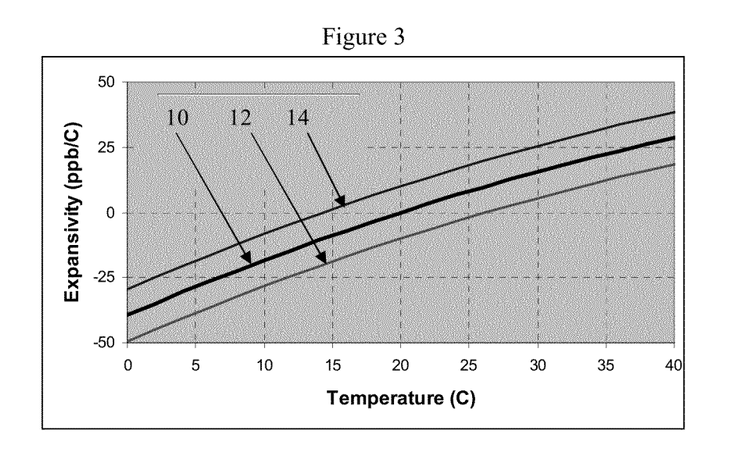
FIG. 3 is a graph illustrating the expansivity curves for samples of commercially available ULE and two additional silica-titania glasses of different compositions (A and B).

Production of mirror substrates for development systems is characterized by the difficulty in producing material that would simultaneously satisfy a number of demanding specifications. One of the difficult specifications is the average Tzc that the substrate must satisfy, which considerably limits the volume of glass available within a boule. Tzc of a volume of ULE glass is controlled by the average chemical composition of that volume of glass; more specifically, the relative concentration of titania with respect to silica. ULE glass of nominal composition (the nominal composition is ~7.5 wt % titania and ~92.5 wt % silica) possesses a Tzc of 20° C. when annealed using the standard fine anneal as is shown by line 10 in FIG. 2 also labeled as "Tzc", and also in FIG. 3 by line 10. A glass that has a higher titania content than the nominal value (the glass thus having a lower than nominal silica content) has a higher Tzc than the Tzc of the nominal value sample as is shown by line 12 in FIG. 3; and a glass that has a lower in titania than the nominal value (that is, the glass is richer in silica) has a lower Tzc as is shown by line 14. Thus, while Tzc can be changed by changing the glass composition, this is undesirable because it would require making a large number of boules of glass and would also create more complex manufacturing, inventory management and warehousing.

When faced with the requirement of producing silica glass having a specific Tzc, the glass forming process can be tuned in order to produce glass with the required average (nominal) composition. However, the composition that is achieved is not always exactly what was intended due to the dependence of the process on many variables that can only be controlled to a certain degree. Moreover, a large boule of silica-titania glass typically presents local variations in the concentration of titania that translate into dependence of Tzc with position in the boule. These variations pose a problem by themselves, but they also affect the average Tzc of a glass part, which varies depending on its exact location within the boule. This limits the amount of glass that is available within a boule for extraction of a part with a particular average Tzc, even if the average for the boule is close to the target Tzc. Moreover, since the part must also satisfy other specification requirements, such as striae and inclusions, which depend on position as well, the average Tzc requirement severely limits the ability to extract parts from any specific boule of ULE® glass.

Figure 4:
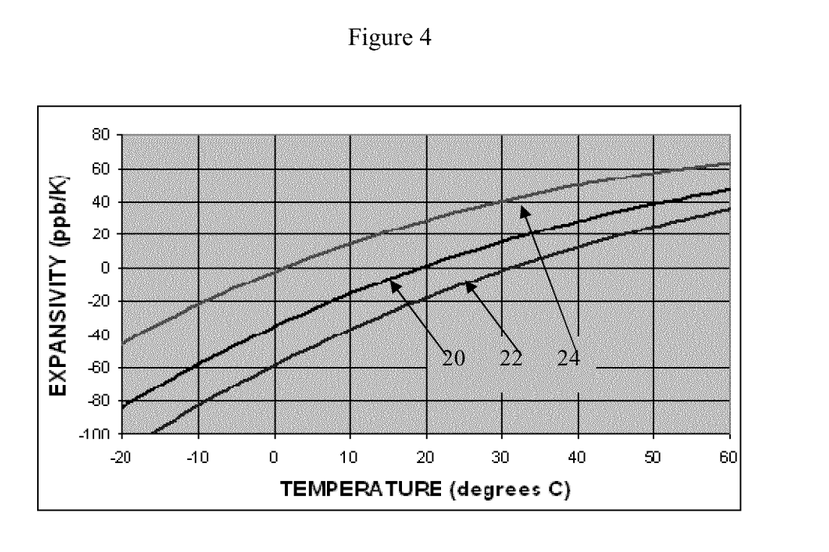
FIG. 4 is a graph illustrating the calculated expansivity curves for ULE® glasses of the same composition that have been annealed using different annealing cycles.

FIG. 4 illustrates the calculated expansivity for samples of silica-titania glass of the same composition that have been annealed using different annealing cycles. All the glass samples come from a boule that was annealed using the standard annealing cycle. This glass had a Tzc=20° C. Subsequently, the samples taken from the boule were subjected to a second annealing cycle and the curves in FIG. 4 represent experimental data for samples that have been through different second annealing cycles (standard cycle, cycle A and Cycle B). As is shown in FIG. 4, the zero crossover temperature Tzc for the glass sample subjected to a second standard annealing cycle (represented by numeral 20) remains at 20° C. However, using different second annealing cycles Tzc can be shifted to the value required by a specific application and can be in a narrower range than can be achieved by controlling only the composition. The curve in FIG. 4 indicated by numeral 22 represents an annealing cycle A and the curve indicated by numeral 24 represents an annealing cycle B. As can be seen in FIG. 4, Tzc is shifted depending on the annealing cycle that is used. Annealing cycle A raises Tzc from 20° C. to ~30° C. (curve 22), and annealing cycle B lowers Tzc from 20° C. to ~2° C. (curve 24). This experimental data shows that Tzc can be raised or powered by subjecting a silica-titania glass sample to a second specific annealing cycle.

Figure 5:
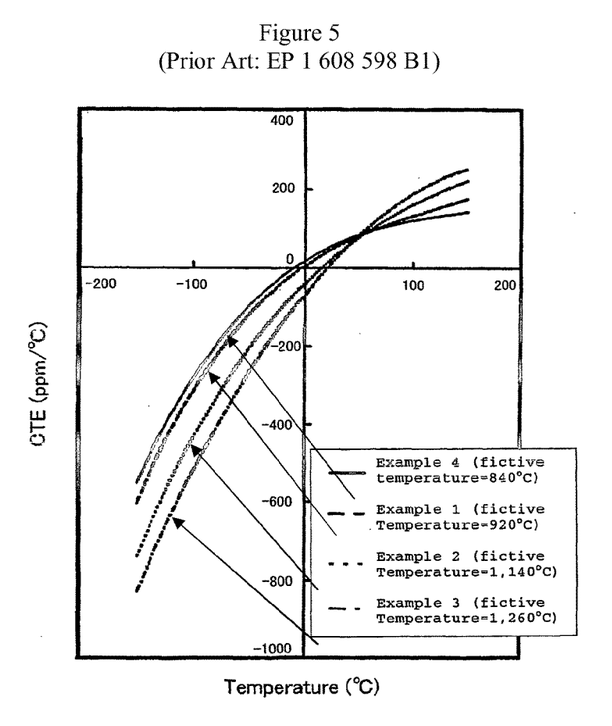
FIG. 5 is taken from EP Patent No. 1 608 598 B1 which demonstrates that lower fictive temperatures yield lower expansivity behavior.

Fine annealing of ULE® glass is known to affect its thermal expansion characteristics. FIG. 5 shows data published in EP 1 608 598 B1 (EP '598) showing the effects of Fictive Temperature, Tf, on thermal expansion. EP '598 ascribes no importance to Tzc (it does not even mention it) in relation to the performance of the material described therein in EUVL applications and no teachings are put forward in relation to controlling or changing this material parameter (that is, Tzc).

In contrast, the present disclosure makes use of the existence of a unique relationship that has been found to link Tzc to Tf for a material having a specific titania concentration. This relationship changes smoothly as a function of titania concentration, and it can be described as a simple function within the range of temperatures of interest for Tzc around room temperature. For example, for a volume of titania-silica glass having a CTE zero crossover temperature Tzc equal to Tzc0, and a fictive temperature Tf0. The following function can be used to describe the relationship between the targeted values of Tf and Tzc.

$$Tf(\text{Target}) = f(Tf0, Tzc0, Tzc(\text{Target})),$$

where Tf0 and Tzc0 together define the initial state of the glass, and Tzc(TARGET) is the targeted Tzc value. This function allows calculating a value Tf(Target) for a desired Tzc(Target) value. Using the known relationship between annealing rate and Tf, the glass is subsequently annealed using the rate required in order to set its Tf=Tf(Target). Alternatively, in order to achieve Tf(Target) more efficiently and in a shorter amount of time, an annealing model can be used to calculate an annealing schedule that will shift Tf to the value Tf(Target).

To exemplify the teachings of the disclosure, a silica-titania glass boule was prepared using the method described herein and was annealed using the standard annealing cycle as described above. After standard annealing and cooling, glass samples were extracted from the boule and Tzc for the samples was determined. The samples were approximately 10 cm in diameter and 2.5 cm thick. All samples as extracted from the boule had Tzc=20° C. and a mean CTE of 0±30 ppb/° C. in the temperature range of 5-35° C. For each annealing cycle the glass sample was placed in a quartz muffle enclosure (to protect it from contamination during the annealing cycle) in an annealing furnace. After annealing and cooling to ambient temperature, the effect of the annealing cycle on Tzc was determined for each sample.

Annealing Cycle $A_1$

Annealing Cycle $A_1$ is the standard cycle in which the temperature is ramped from 25° C. to 990° C. at a rate of 50° C./hour and held at the temperature at 990° C. for 10 hours. After the 10 hour hold, the temperature is lowered from 990° C. to 850° C. at a rate of 3° C./hour; and then the temperature is lowered from 850° C. to 25° C. at a rate of 25° C./hour.

Annealing Cycles $A_2$-$A_6$

Annealing Cycles $A_2$-$A_6$ are cycles in which the temperature is ramped from 25° C. to 1020° C. at a rate of 10° C./minute and held at the temperature at 1020° C. for 1 hour. After the 1 hour hold, the temperature is lowered from 1020° C. to 800° C. at a rate of "$X_1$-$X_5$" ° C./hour (see Table 1); and then the temperature is lowered from 800° C. to 25° C. at a rate of 5° C./hour.

Six different glass samples were subjected to a $2^{nd}$ annealing using the annealing schedules $A_1$-$A_6$ (annealing cycle $A_1$ being the standard cycle) and the Tzc for each sample was determined as shown in Table 1. Sample 1 has thus undergone two standard annealing cycles, the second standard cycle being indicated in Table 1, and serves the reference sample for determining the effect of changes in the annealing cycle on Tzc. Samples 2-6 have each undergone the standard annealing cycle and a second annealing cycle as also indicated in Table 1 and the paragraphs above.

TABLE 1

| Sample No. | $2^{nd}$ Anneal Cycle | Cool Rate X, ° C./hour | Tzc, ° C. |
|---|---|---|---|
| 1 | $A_1$, standard | $X_1$ = 3° C./hour‡ | 20, unshifted |
| 2 | $A_2$ | $X_2$ = 0.2* | ~−11 |
| 3 | $A_3$ | $X_3$ = 0.87* | ~2 |
| 4 | $A_4$ | $X_4$ = 3* | 18 |
| 5 | $A_5$ | $X_5$ = 12* | ~28 |
| 6 | $A_6$ | $X_6$ = 45* | ~30 |

Figure 6:
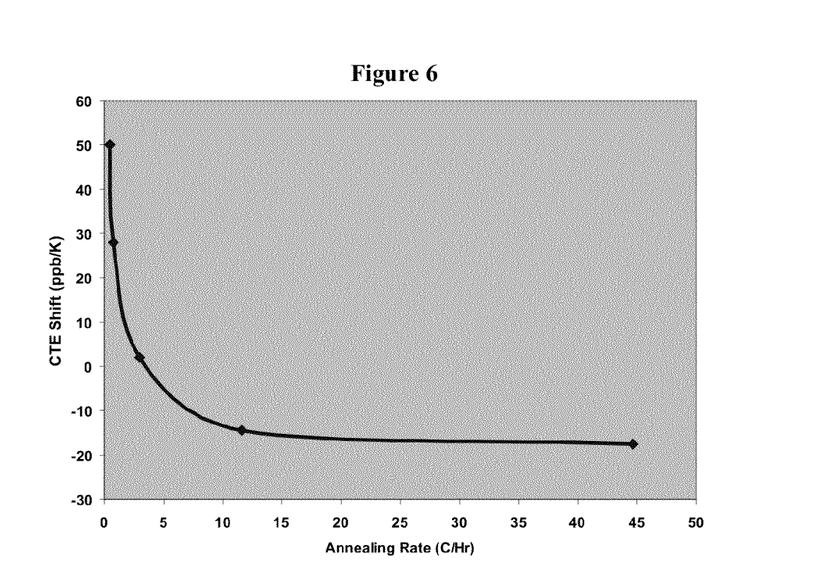
FIG. 6 is a graph illustrating the CTE shift of a silica-titania glass as a function of the annealing rate.

‡The shown cooling rate $X_1$ is from 990-850° C., and below 850° C. the rate is 25° C./hr.
*The shown cooling rates $X_2$-$X_6$ are from 1020° C. to 800° C., and below 800° C. the rate is 3° C.
The symbol "~" means "approximately:

FIG. 6 illustrates CTE shift for Samples 2-6 as a function of the annealing cycle rate. The samples 2-6 all showed a CTE shift as the result of being subjected to a second annealing cycle that was differed from the standard annealing cycle. Sample 4, which was cooled from 1020° C. to 800° C. at 3° C./hour, and then to 25° C. at 3° C./hr shows a CTE closest to zero at 20° C., and thus has the smallest change relative to Sample 1's Tzc of 20° C. (not illustrated). Samples 2 and 3, which were cooled between 1020° C. to 800° C. at a rate less than that of Sample 4, show high positive CTE shift relative to Sample 4. Samples 5 and 6, which were cooled between 1020° C. to 800° C. at a rate greater than that of Sample 4, show negative CTE shift relative to Sample 4. Samples 2-6 are read from left to right along the curve.

Figure 7:
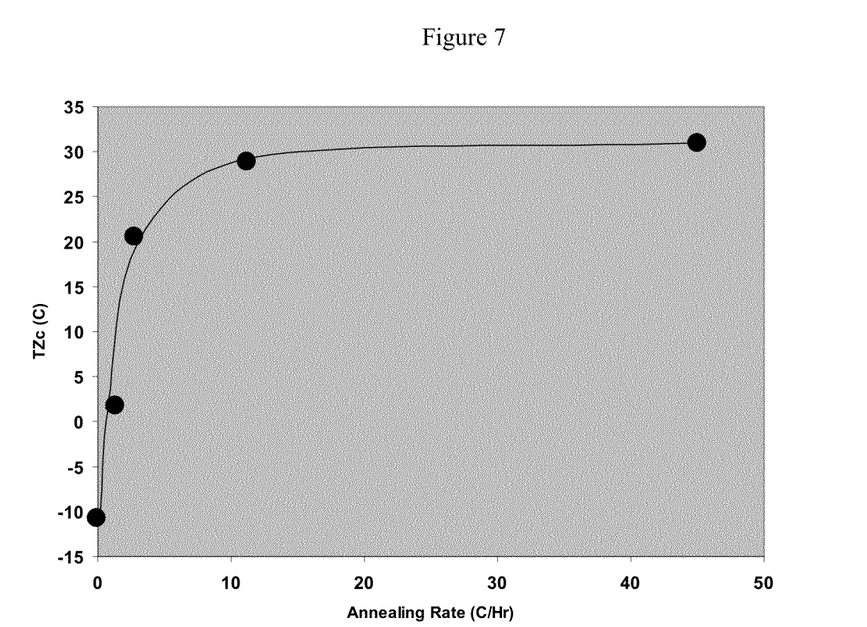
FIG. 7 is a graph illustrating Tzc as a function of the annealing rate.

FIG. 7 shows the change in Tzc as a function of the annealing cycle rate. Tzc for the reference glass of Sample 1 is 20° C. (not illustrated). Sample 4, Tzc of approximately 18° C., is the Sample that most closely resembles Sample 1. While Samples 1 and 4 saw approximately the same maximum temperature (990° C. for Sample 1 and 1020° C. for sample 40) and were cooled from these temperature to 850° C. or less at the same rate, the differences between their annealing cycles A1 and A4 are sufficiently different so that Tzc is 18° C. for sample 4 whereas it is 20° C. for Sample 1. For Samples where the cooling rate between 1020° C. to 800° C. was greater than 3° C./hr, Tzc increases to values greater than 20° C. the as the cooling rate increases. For Samples where the cooling rate between 1020° C. to 800° C. was less than 3° C./hr, Tzc decreases to values less than 20° C. the as the cooling rate decreases. These changes in Tzc with annealing rate, and hence annealing cycle, indicate that for a glass having a selected Tzc, that Tzc can be increased or decreased by the choice of an appropriate second annealing cycle.

Figure 8:
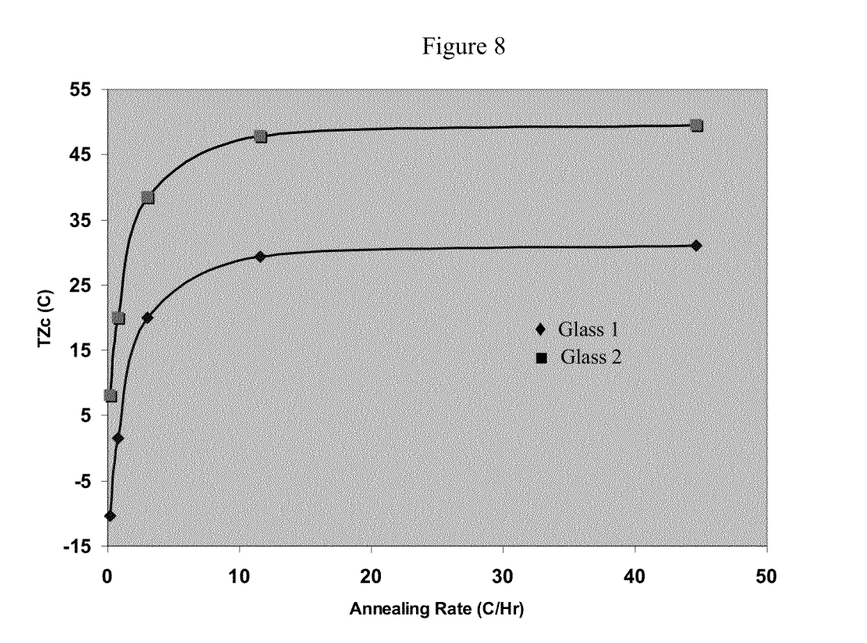
FIG. 8 is a graph illustrating Tzc of two glasses, Glass 1 and Glass 2, as a function of the annealing rate.

FIG. 8 illustrates the change in Tzc for two different Glasses 1 and 2 as a function of annealing cycle. For all annealing rate the Tzc values for Glass 1 are greater than those for Glass 2. Glass 2 is a silica-titania glass of nominal 7.4 wt % titania and glass 1 has a nominal titania content of ~9 wt %. FIG. 2 illustrates that while Glasses 1 and 2 may have different titania contents and Tzc values, in each case Tzc cab be changed by use selected annealing cycles.

Figure 9:
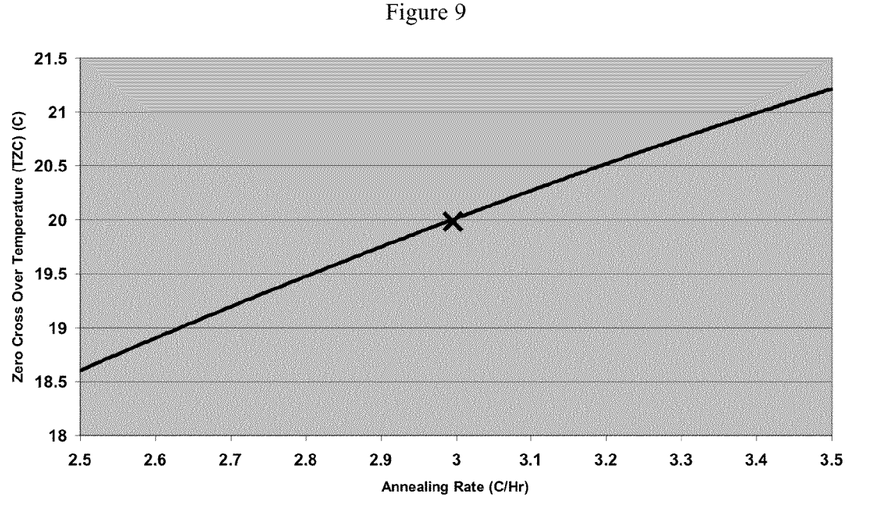
FIG. 9 is a graph illustrating Tzc as a function of the annealing rate in the annealing range of 2.5-3.5° C./hr.

FIG. 9 illustrates that fine adjustments to Tzc can be made by making small adjustments in the annealing rate. In FIG. 9 Tzc was determined for a adjustments in annealing rate such that the cooling rates in the temperature range 1020° C. and 800° C. lay between 2.5° C./hr and 3.5° C./hr. Over this 2.5-3.5° C./hr annealing rate range, the Tzc values of the glass changes by approximately 1.7° C., going from Tzc approximate equal to 18.6 at an anneal rate of 2.5° C./hr to Tzc approximately 21.2 at an anneal rate of 3.5° C./hr.

While the disclosure describes a limited number of embodiments, those skilled in the art, having benefit of this disclosure, will appreciate that other embodiments can be devised which do not depart from the scope as disclosed herein. Accordingly, the scope of the should be limited only by the attached claims.

We claim:

1. A method for adjusting the zero crossover temperature of a silica-titania glass, the method comprising the steps of:
   preparing a consolidated silica-titania glass boule having a titania content in the range of 5-20 wt %,
   annealing the consolidated silica-titania glass boule using a first anneal cycle to form a silica-titania glass having an initial state, the initial state including an initial zero crossover temperature Tzc0 and an initial fictive temperature Tf0,
   determining the initial zero crossover temperature Tzc0 and the initial fictive temperature Tf0 of the silica-titania glass,
   specifying a target state for the silica-titania glass, the target state including a target fictive temperature Tf(TARGET) and a target zero crossover temperature Tzc(TARGET),
   subjecting the silica-titania glass to a second anneal cycle, the second anneal cycle transforming the silica-titania glass from the initial state to the target state, the conditions of the second anneal being determined using the function $$Tf(TARGET)=f(Tf0,Tzc0,Tzc(TARGET))$$

wherein the target zero crossover temperature Tzc(Target) of the silica-titania glass is within ±10° C. of the initial crossover temperature Tzc0 of the silica-titania glass.

2. The method according to claim 1, wherein the second anneal cycle comprises:
   heating the silica-titania glass from ambient temperature to a selected high temperature in the range of 900° C. to 1050° C.;
   holding the silica-titania glass at the selected high temperature for a time longer than the relaxation time constant for the silica-titania glass based on its initial fictive temperature Tf0 at the selected high temperature;
   cooling the silica-titania glass from the selected high temperature to a selected intermediate temperature in the range of 750° C. to 850° C. at a selected cooling rate of X ° C./hour, wherein the cooling rate X is in the range of 0.05° C./hour to 50° C./hour; and
   cooling the silica-titania glass from the intermediate temperature to ambient temperature at a cooling rate in the range of 5-100° C./hour.

3. The method according to claim 2, wherein the hold time at the selected high temperature is in the range of 0.5 hour to 12 hours.

4. The method according to claim 2, wherein the cooling from the selected high temperature to the selected intermediate temperature is subdivided into a series of smaller steps with each step having its own specific cooling rate and temperature range, with the cooling rate for each successive step decreasing as the step-to-step temperature decreases.

5. The method according to claim 1, wherein the second anneal cycle comprises:
   heating the silica-titania glass from ambient temperature to a temperature in the range of 930° C. to 1020° C.,
   holding the silica-titania glass at the 930° C. to 1020° C. temperature range for a time in the range of 0.75 to 2.0 hours,
   cooling the silica-titania glass from the 930° C. to 1020° C. range to 800° C. at a selected cooling rate of X ° C./hour, wherein the cooling rate X is in the range 0.2° C./hour to 50° C./hour; and
   cooling the silica-titania glass from 800° C. to ambient temperature at a rate in the range of 3-8° C./hour.

6. The method according to claim 5, wherein the cooling rate from 800° C. to 25° C. is in the range of 4-6° C./hour.

7. The method according to claim 5, wherein the hold time at 1020° C. is 1 hour±0.2 hour.

8. The method according to claim 5, wherein the silica-titania glass has a titania content in the range of 5-12 wt % and the target zero crossover temperature Tzc(Target) of the silica-titania glass is within ±5° C. of the initial crossover temperature Tzc0 of the silica-titania glass.

9. The method according to claim 5, wherein the silica-titania glass has a titania content in the range of 6-9 wt % and the target zero crossover temperature Tzc(Target) of the silica-titania glass is within ±5° C. of the initial crossover temperature Tzc0 of the silica-titania glass.

10. The method according to claim 5, wherein the silica-titania glass has a titania content in the range of 12-16 wt % and the target zero crossover temperature Tzc(Target) of the silica-titania glass is within ±5° C. of the initial crossover temperature Tzc0 of the silica-titania glass.

* * * * *